US011981144B2

United States Patent

(12) United States Patent
Jeran et al.

(10) Patent No.: US 11,981,144 B2
(45) Date of Patent: May 14, 2024

(54) DETERMINING NEW REMAINING USAGE OF CARTRIDGE

(71) Applicant: HEWLETT-PACKARD DEVELOPMENT COMPANY, L.P., Spring, TX (US)

(72) Inventors: Paul L Jeran, Boise, ID (US); Alex Oaks, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 148 days.

(21) Appl. No.: 17/789,851

(22) PCT Filed: Apr. 10, 2020

(86) PCT No.: PCT/US2020/027666
§ 371 (c)(1),
(2) Date: Jun. 29, 2022

(87) PCT Pub. No.: WO2021/206731
PCT Pub. Date: Oct. 14, 2021

(65) Prior Publication Data
US 2023/0037247 A1 Feb. 2, 2023

(51) Int. Cl.
*B41J 2/175* (2006.01)
*G03G 15/08* (2006.01)

(52) U.S. Cl.
CPC ...... *B41J 2/17546* (2013.01); *G03G 15/0863* (2013.01)

(58) Field of Classification Search
CPC .............. B41J 2/17546; B41J 2/17566; G03G 15/0863
See application file for complete search history.

(56) References Cited

U.S. PATENT DOCUMENTS

| | | | | |
|---|---|---|---|---|
| 7,044,574 | B2 | 5/2006 | Croley et al. | |
| 7,801,453 | B2 | 9/2010 | Golding et al. | |
| 8,095,021 | B2 | 1/2012 | Mochizuki | |
| 8,348,377 | B2 | 1/2013 | Asauchi | |
| 9,651,893 | B2 | 5/2017 | Asaka | |
| 9,904,227 | B2 | 2/2018 | Kanakubo | |
| 10,205,596 | B2 | 2/2019 | Jeran et al. | |
| 10,525,716 | B1 * | 1/2020 | Deboard | B41J 2/17546 |
| 2004/0212651 | A1 | 10/2004 | Johnson et al. | |
| 2007/0273912 | A1 | 11/2007 | Maurin | |
| 2014/0376931 | A1 | 12/2014 | Thacker et al. | |
| 2017/0182784 | A1 | 6/2017 | Jeran | |

FOREIGN PATENT DOCUMENTS

| | | | |
|---|---|---|---|
| EP | 3 552 828 | A1 | 10/2019 |
| JP | 2013-76930 | A | 4/2013 |

* cited by examiner

*Primary Examiner* — Lisa Solomon
(74) *Attorney, Agent, or Firm* — Foley & Lardner LLP

(57) ABSTRACT

An example printing material cartridge may include an input/output device and a memory. The memory may store an identifier of the cartridge, a usage counter of the cartridge, and an indicator that the cartridge has reached a usage threshold. The memory may also store a usage offset equal to a historical usage of the cartridge, the usage offset for determining a new remaining usage of the cartridge.

15 Claims, 9 Drawing Sheets

DETERMINING NEW REMAINING USAGE OF CARTRIDGE

BACKGROUND

Under various conditions, a printing material cartridge may be remanufactured for re-use in a printer. For example, when a printing material of the printing material cartridge is depleted, the printing material cartridge may be refilled with printing material to be re-used in a printer. The printing material cartridge may also include an integrated circuit chip to track various parameters of the printing material cartridge.

BRIEF DESCRIPTION OF THE DRAWINGS

Various examples will be described below by referring to the following figures.

DESCRIPTION

Figure 1A:
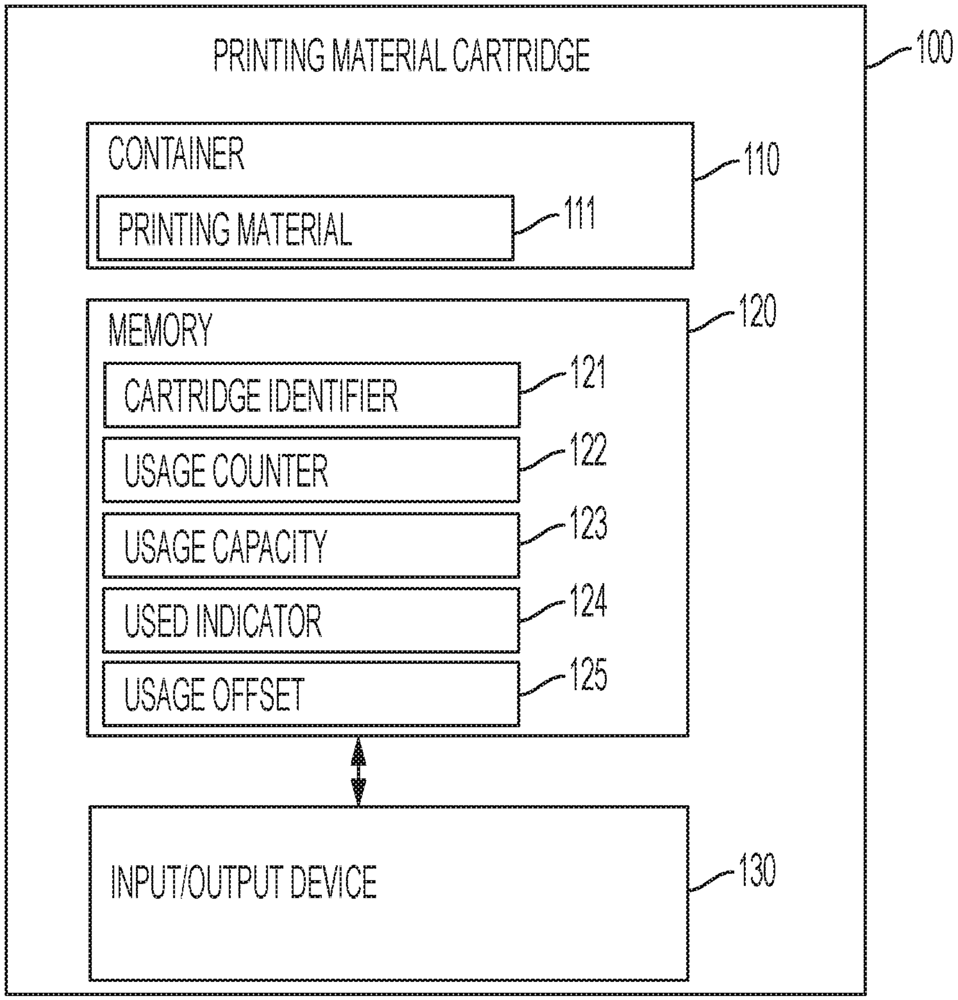
FIG. 1A illustrates a printing material cartridge according to an example.

Hereinafter, various examples will be described with reference to the drawings. Like reference numerals in the specification and the drawings denote like elements, and thus a redundant description may be omitted.

In the following description, the term "printer" may be used to describe an example of an image forming apparatus that uses a printing material cartridge. Other examples of an image forming apparatus may include a copier, a scanner, a fax machine, a multi-function printer (MFP) that complexly realizes their functions through one apparatus, a three-dimensional (3D) printer, and the like, such that the described examples are not to be construed as limited to a certain type of image forming apparatus. Further, the term "printer" may be used to refer to an image forming apparatus using different printing methods such as an electrophotography method, an ink-jet method, a 3D method, and the like.

A printing material cartridge may be provided for use with a printer. As an example, a printing material cartridge may be installed in a printer to supply a printing material for use by the printer to form an image on a printing medium. The printing material cartridge may include an integrated circuit chip having a memory to store an identifier and other information of the printing material cartridge. Using the information from the memory of the printing material cartridge, the printer may determine and display a remaining usage of the printing material cartridge for a user's convenience.

After depletion of the printing material, the printing material cartridge may be removed from the printer and refilled with printing material or otherwise remanufactured so that it may be used again. However, upon detecting installation of a remanufactured cartridge, the printer may no longer display a remaining usage of the printing material cartridge. For example, because the printing material cartridge has been remanufactured, the printer may be unaware of an amount of printing material refilled in the printing material cartridge such that it is unable to determine the remaining usage with accuracy. In that case, the printer may display a message such as "used cartridge" rather than displaying the remaining usage of the printing material cartridge. The lack of an indication of the remaining usage of the printing material cartridge may be an inconvenience to the user and may create a perception that a printing material cartridge having a chip is not eco-friendly as it cannot provide a desired user experience after it is remanufactured.

FIG. 1A illustrates a printing material cartridge according to an example.

Referring to FIG. 1A, a printing material cartridge (hereinafter "cartridge") 100 is a replaceable component that may be installed in a printer. The cartridge 100 may include a container 110, a memory 120, and an input/output device 130.

The container 110 may include a printing material 111 such as toner, developer, ink, etc. When installed in a printer, the cartridge 100 may supply the printing material 111 to the printer for use in an image forming job. The memory 120 may be included in an integrated circuit chip that is affixed to the cartridge 100. The memory 120 may store various data such as a cartridge identifier 121, a usage counter 122, a usage capacity 123, a used indicator 124, and a usage offset 125.

The cartridge identifier 121 may include a unique identifier of the cartridge 100. For example, the cartridge identifier 121 may include a serial number or similar data to identify the cartridge 100.

The usage counter 122 may indicate an amount of printing material 111 expended by the cartridge 100. As an example, the usage counter 122 may include a counter to track usage of the cartridge 100 such as a counter to track the number of pages printed by the cartridge 100. In other examples, the usage counter 122 may include a colorant counter indicating an amount of colorant expended by the cartridge or a dot counter indicating a number of dots printed by the cartridge 100. In various examples, the usage counter 122 may be provided as a counter that cannot be reset to avoid fraudulent use of the cartridge 100.

The usage capacity 123 may correspond to an amount of printing material 111 included in the container 110 at the time of manufacture. As an example, the cartridge 100 may be provided with an amount of printing material 111 to print 10,000 pages such that the usage capacity 123 is 10,000 pages. In other examples, the usage capacity 123 may be indicated in terms of an amount of colorant, a number of dots, etc.

The usage counter 122 and the usage capacity 123 may be used to determine a remaining usage of the cartridge 100. In more detail, the remaining usage of the cartridge 100 may be determined in terms of percentage based on the usage counter 122 and the usage capacity 123 using Equation 1:

$$\text{Remaining Usage} = \left(1 - \left(\frac{\text{Usage Counter}}{\text{Usage Capacity}}\right)\right) \times 100\% \qquad \text{Equation 1}$$

For example, if 9,500 pages have been printed using the cartridge 100 such that the usage counter 122 indicates 9,500 pages, and the cartridge 100 was originally supplied with an amount of printing material 111 to print 10,000 pages such that the usage capacity 123 is set to 10,000 pages, the remaining usage of the cartridge 100 may be determined to be 5% using Equation 1 (e.g., (1−(9,500/10,000))×100%=5%). In that case, the printer in which the cartridge 100 is installed may display the remaining usage (e.g., 5%) for a user's convenience. The printer may also display a message based on the remaining usage, such as a message indicating a low level of printing material 111, a message suggesting to have a replacement cartridge 100 ready, and the like.

The used indicator 124 may indicate that the remaining usage of the cartridge 100 has reached or exceeded a capacity threshold. As an example, if a low capacity threshold is set at 10% and the remaining usage of the cartridge 100 is determined to be 5%, the used indicator 124 may be set to indicate that the cartridge 100 has reached a low threshold and thus is considered a used cartridge. That is, because the determined 5% remaining usage is less than the 10% threshold, the cartridge 100 may be considered used and the used indicator 124 set to indicate the used status. In other examples, the low capacity threshold may have a value other than 10% such as a value between 2% to 10%. Although not shown in FIG. 1, the low capacity threshold may be stored in the memory 120 of the cartridge 100, or may be determined by the printer, such as stored in a memory of the printer, received as an input from a user of the printer, received from an external source, or the like. The used indicator 124 may include a binary flag to indicate whether the low threshold has been met or not. As an example, the used indicator 124 may be set to "1" to indicate that the low capacity threshold has been reached and may be set to "0" to indicate that the low capacity threshold has not been reached.

The usage offset 125 may be set to correspond to a historical usage of the cartridge 100 and may be used to determine a new remaining usage of the cartridge 100 after remanufacturing of the cartridge 100. In more detail, a value of the usage counter 122 may be determined at the time of remanufacturing the cartridge 100, which value represents a historical usage of the cartridge 100, and the usage offset 125 may be set to the determined historical value of the usage counter 122.

As an example, if the usage counter 122 indicates that 9,500 pages have been printed at the time of remanufacture, the printer may consider the historical usage of the cartridge to be 9,500 pages and set the usage offset 125 equal to 9,500 pages. After the usage offset 125 is determined and set, the usage offset 125, with the usage counter 122 and the usage capacity 123, may be used to determine a new remaining usage of the cartridge 100. As an example, the new remaining usage of the cartridge 100 may be determined based on the usage counter 122, the usage capacity 123, and the usage offset 125 using Equation 2:

Equation 2

$$\text{New Remaining Usage} = \left(1 - \left(\frac{\text{Usage Counter} - \text{Usage Offset}}{\text{Usage Capacity}}\right)\right) \times 100\%$$

In an example, it may be assumed that the cartridge 100 was remanufactured to replenish the printing material 111 after printing 9,500 pages such that the historical usage of the cartridge 100 is 9,500 pages. In that case, the usage offset 125 of the cartridge 100 may be set to the historical usage of 9,500 pages. Also, it may be assumed that the cartridge 100 was replenished to its original usage capacity 123 of 10,000 pages. In that case, a new remaining life of the cartridge 100 may be determined using Equation 2. For example, if it is determined that the usage counter 122 has increased to 10,500 pages based on an additional 1,000 pages printed since remanufacture, Equation 2 may be used to determine a new remaining life of 90% (e.g., (1−(10,500−9,500/10,000))×100%=90%). Using the determined new remaining usage, a printer may display this information to a user and thus improve user convenience as opposed to displaying a message such as "used cartridge."

The input/output device 130 may transmit/receive data to/from an external source. As an example, when the cartridge 100 is installed in a printer, the input/output device 130 may allow the cartridge 100 to transmit/receive data to/from the printer. The input/output device may include a series of contact pads and conductive traces.

Figure 1B:
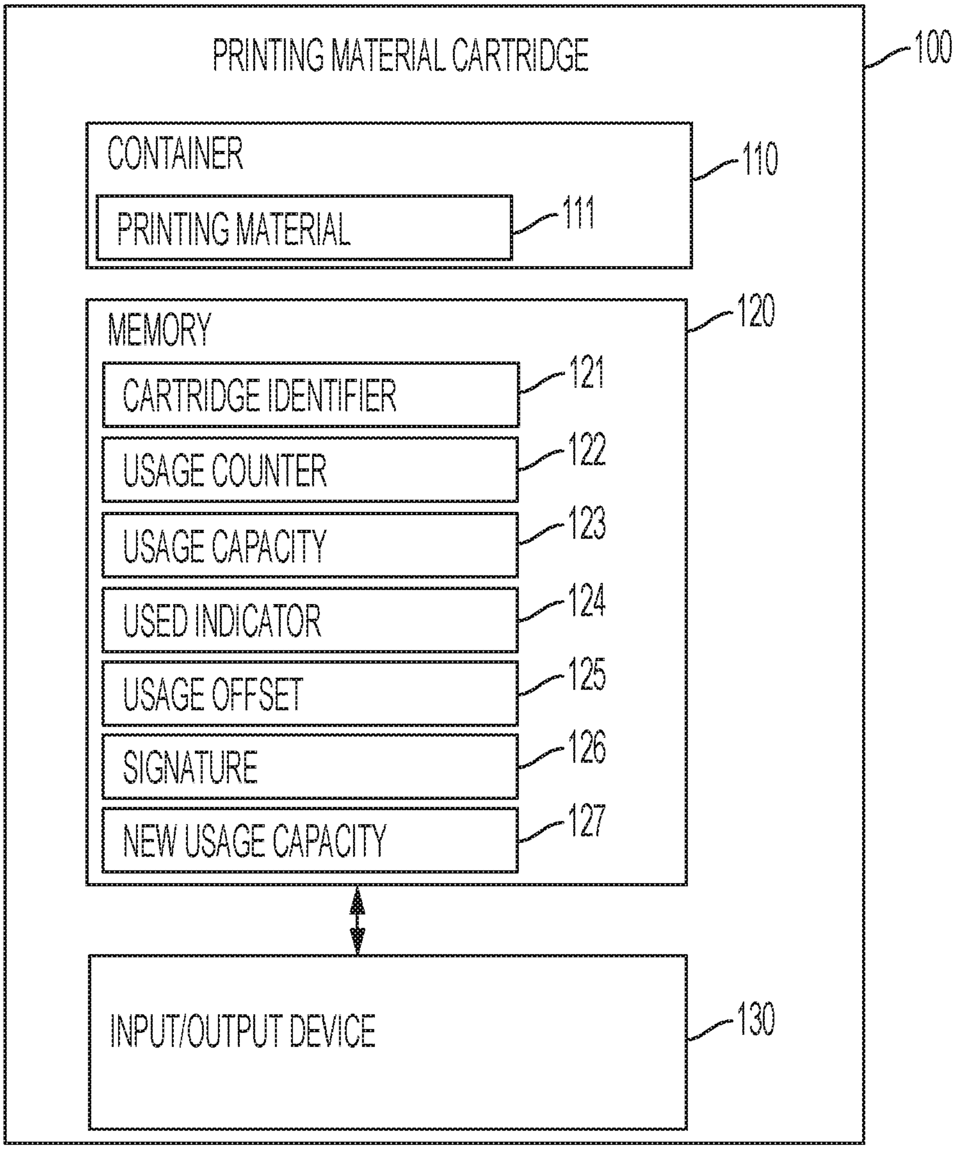
FIG. 1B illustrates a printing material cartridge according to an example.

FIG. 1B illustrates a printing material cartridge according to an example.

In the following description, differences between the cartridge 100 of FIG. 1A and the cartridge 100 of FIG. 1B are mainly described. Elements that perform the same functions as those described above are denoted by the same reference numerals, and redundant descriptions thereof may be omitted.

Referring to FIG. 1B, the memory 120 of the cartridge 100 may include a signature 126 and/or a new usage capacity 127. The signature 126 may be provided during remanufacture of the cartridge 100 as a security measure to confirm the validity of the data in cartridge 100. As an example, the signature 126 may be provided over other data included in the memory 120, such as the cartridge identifier 121, the usage offset 125, or the new usage capacity 127 such that access to the other data is verified as authentic. For example, upon installation of the cartridge 100 in a printer, the printer may determine that the signature 126 is present and validate if the data present on the supply was generated by a trusted source. This authorizes the printer to use the usage offset 125 to determine a new remaining usage of the cartridge 100. In another example, the printer may communicate with an external source, such as an external cloud server, to determine if the printer is authorized to use the cartridge 100 or the usage offset 125.

The new usage capacity 127 may be provided for use in determining a new remaining usage. For example, if the usage capacity 123 of the cartridge 100 before being remanufactured is 10,000 pages, a remanufacturer may provide more or less printing material 111 such that the usage capacity 123 after remanufacture is not accurate. In that case, the remanufacturer of the cartridge 100 may input the new usage capacity 127 to reflect the amount of printing material 111 and thus to determine the new remaining usage. That is, if the new usage capacity 127 is provided, the new usage capacity 127 is used in Equation 2 in place of usage capacity 123. In another example, the new usage capacity 127 may be input by a user of a printer in which the remanufactured cartridge 100 is installed. In another example, the new usage capacity 127 may be received from an external source such as an external cloud server upon installation of the remanufactured cartridge 100 in the printer or further based on satisfying a security condition using the signature 126.

Although FIG. 1B illustrates an example in which both the signature 126 and the new usage capacity 127 are provided in the memory 120 of cartridge 100, in other examples, only one of the signature 126 or the new usage capacity 127 may be provided.

Figure 1C:
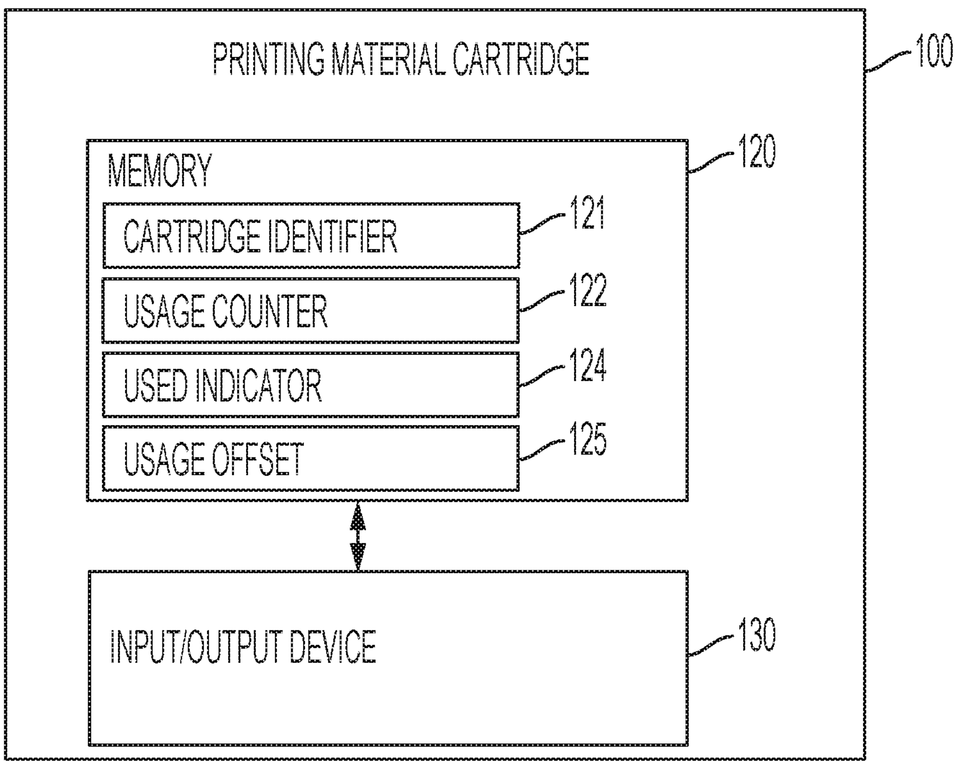
FIG. 1C illustrates a printing material cartridge according to an example.

FIG. 1C illustrates a printing material cartridge according to an example.

In the following description, differences between the cartridge 100 of FIG. 1A and the cartridge 100 of FIG. 1C are mainly described. Elements that perform the same functions as those described above are denoted by the same reference numerals, and redundant descriptions thereof may be omitted.

Referring to FIG. 1C, the cartridge 100 includes the memory 120 and the input/output device 130. The memory 120 may be included in an integrated circuit chip that is affixed to the cartridge 100. The memory 120 may store the cartridge identifier 121, the usage counter 122, the used indicator 124, and the usage offset 125.

In the example of FIG. 1C, information regarding a usage capacity of the cartridge 100 (e.g., usage capacity 123) is not included in the memory 120. In this case, the usage capacity may be provided by an external source, such as a user of a printer in which the cartridge 100 is installed or a cloud server maintained by the remanufacturer. The usage capacity may be provided to a printer in which the cartridge 100 is installed and the usage capacity may be stored in a memory of the printer. The usage capacity provided by the external source may be used to determine a new remaining usage of the cartridge 100.

The input/output device 130 may transmit/receive data to/from an external source. As an example, when the cartridge 100 is installed in a printer, the input/output device 130 may allow the cartridge 100 to transmit/receive data to/from the printer. The input/output device may include a series of contact pads and conductive traces.

Figure 2A:
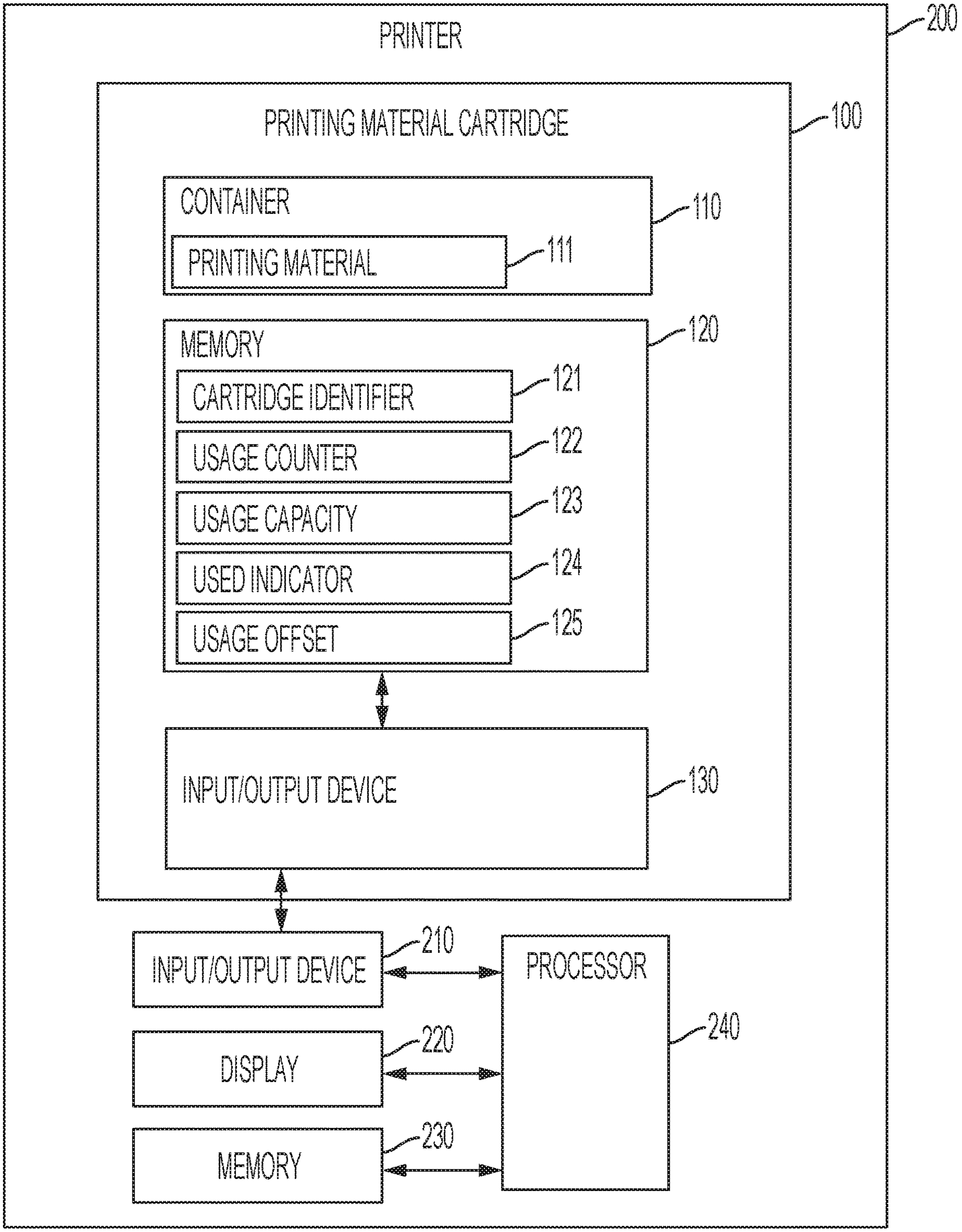
FIG. 2A illustrates a printer including a printing material cartridge according to an example.

FIG. 2A illustrates a printer including a printing material cartridge according to an example.

Referring to FIG. 2A, a printer 200 may include an input/output device 210, a display 220, a memory 230, and a processor 240. Although not illustrated, the printer 200 may include additional components such as a power supply, a print engine, and the like. The printer 200 may have installed therein a cartridge 100, such as the cartridge 100 of FIG. 1A. Regarding the cartridge 100, elements that perform the same functions as those described with reference to FIG. 1A are denoted by the same reference numerals, and redundant descriptions thereof may be omitted.

The input/output device 210 may transmit/receive data to/from an external source of the printer 200. As an example, when the cartridge 100 is installed in the printer 200, the input/output device 210 may allow the printer 200 to transmit/receive data to/from the cartridge 100 using the input/output device 130 of the cartridge 100. The input/output device 210 may include a series of contact pads and conductive traces.

The display 220 may include a liquid crystal display (LCD), a light emitting diode (LED) display, an organic LED (OLED) display, or the like. The display 220 may receive data from the processor 240 and display the data. For example, the display 220 may display a new remaining usage of the cartridge 100. The display 220 may also display information such as a result of performing of an image forming job, a state of the printer, and the like.

The memory 230 may store an operating system, application programs, a printer driver, and the like. In an example, the memory 230 may store an identifier of the cartridge 100 and use the stored identifier to determine if the cartridge 100 has been previously used with the printer 200. That is, the printer 200 may compare the stored identifier with the identifier 121 received from the cartridge 100.

The memory 230 may store instructions that are executable by the processor 240. As an example, the memory 230 may store instructions to determine a new remaining usage of the cartridge 100. In more detail, the memory 230 may store instructions to determine whether the installed cartridge 100 is a remanufactured cartridge by determining whether the used indicator 124 indicates a used status of the cartridge 100 and whether the cartridge identifier 121 corresponds to a value stored in the memory 230. If the cartridge 100 is determined to be a remanufactured cartridge, the instructions may set the usage offset 125 equal to a historical usage of the cartridge 100 (e.g., a value of the usage counter 122 at the time of setting the usage offset) and determine a new remaining usage based on the usage counter 122, the usage capacity 123, and the usage offset 125 using Equation 2.

The processor 240 may execute the instructions stored in the memory 230. As an example, the processor 240 may execute the instructions to determine if the cartridge 100 is a remanufactured cartridge, to set the usage offset 125 equal to a historical usage of the cartridge 100, and to determine a new remaining usage using the usage counter 122, the usage capacity 123, and the usage offset 125. The processor 240 may also control the display 220 to display a determined new remaining usage.

Figure 2B:
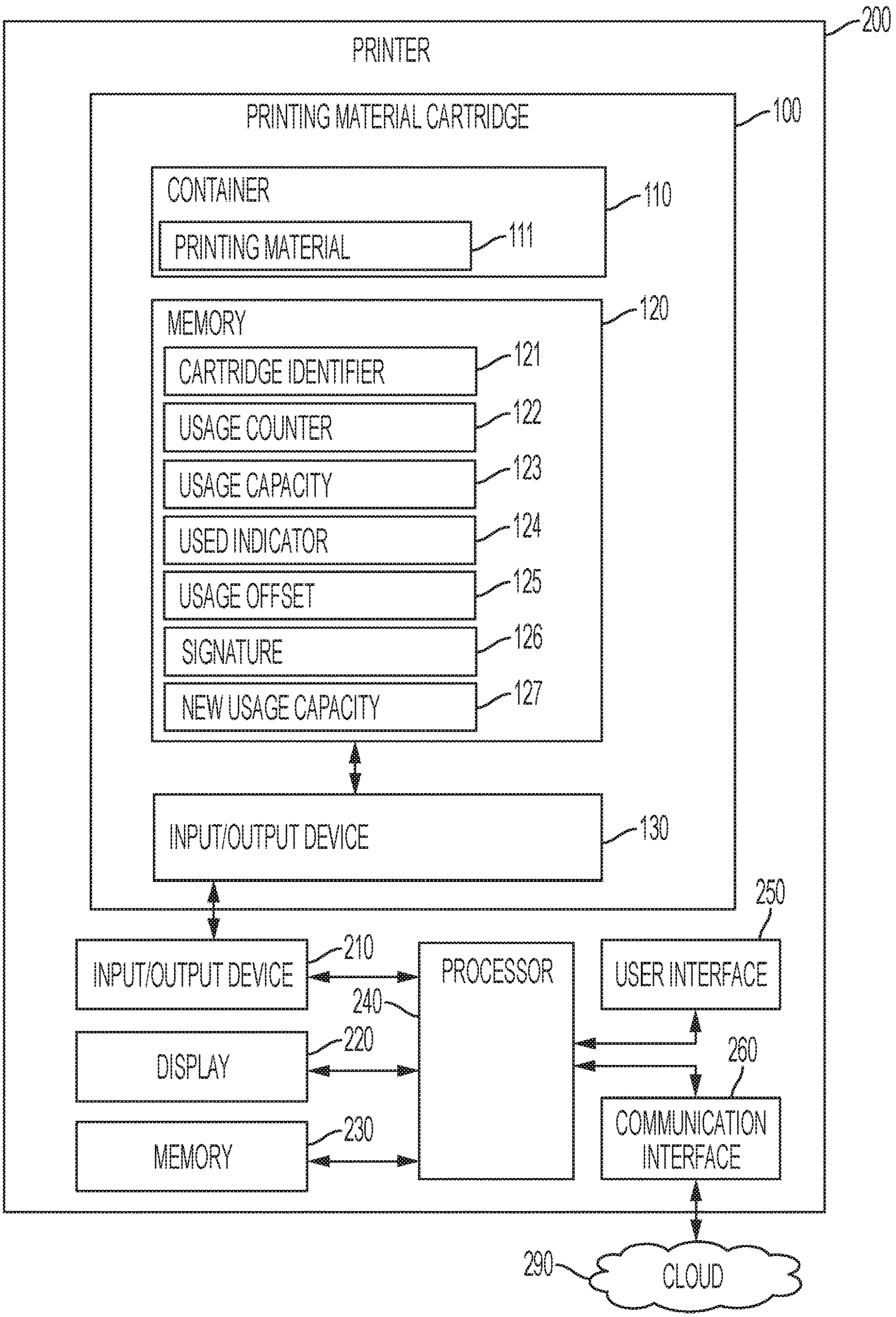
FIG. 2B illustrates a printer including a printing material cartridge according to an example.

FIG. 2B illustrates a printer including a printing material cartridge according to an example.

In the following description, differences between the printer 200 of FIG. 2A and the printer 200 of FIG. 2B are mainly described. Elements that perform the same functions as those described above are denoted by the same reference numerals, and redundant descriptions thereof may be omitted.

Referring to FIG. 2B, the printer 200 may include a user interface 250 and a communication interface 260. The user interface 250 may include an input unit for receiving a user input and an output unit for displaying various information of the printer 200. In an example, the user interface 250 may be provided as a touch screen including a display component such that the separate display 220 is not provided. The user interface 250 may display information such as a new remaining usage of the cartridge 100, a result of performing of an image forming job, a state of the printer 200, a message, etc. Also, the user interface 250 may receive a user input of a password corresponding to the signature 126, an input of the new usage capacity 127, an instruction to perform an image forming job, etc.

In an example, the user interface 250 may display a security prompt upon installation of the cartridge 100 in the printer 200. The security prompt may request a user input of a password, a security code, etc. to match or otherwise correspond to the signature 126 of the cartridge 100. The user interface 250 may provide the received user input to the processor 240, which may provide the user input to the communication interface 260 for transmission to an external cloud server 290. The communication interface 260 may receive confirmation from the external cloud server 290 that the user input corresponds to the signature 126 such that the printer 200 may proceed with use of the cartridge 100 or proceed with determining the new remaining usage based on the usage offset 125. Still further, the external cloud server 290 may provide the usage offset 125 or the new usage capacity 127.

The user interface 250 may also receive a user input regarding the new usage capacity 127 of the cartridge 100. For example, upon installation of the remanufactured cartridge 100, the display 220 (or the user interface 250) may request a user input as to whether to use the usage capacity 123 or if the cartridge 100 has been remanufactured to a state in which the amount of printing material 111 is greater than or less than the usage capacity 123. If the cartridge 100 has been remanufactured to a state in which the amount of printing material 111 is greater than or less than the usage capacity 123, the new usage capacity 127 may be input using the user interface 250. The new usage capacity 127 may be stored in the memory 120 of the cartridge 100 and may also be stored in the memory 230 of the printer. Also, the new usage capacity 127 may be used in Equation 2, in place of the usage capacity 123, to determine the new remaining usage of the cartridge 100.

The communication interface 260 may include a transceiver to perform wired or wireless communication with another device or a network. In the example illustrated in FIG. 2B, the communication interface 260 performs communication with the external cloud server 290.

The external cloud server 290 may be provided by a manufacturer of the printer 200, a manufacturer of the cartridge 100, a remanufacturer of the cartridge 100, or another party. The external cloud server 290 may provide remote data processing and storage, such as security processing to determine authentication of a user based on the signature 126, storage of the usage offset 125, storage of the new usage capacity 127, etc.

Figure 3:
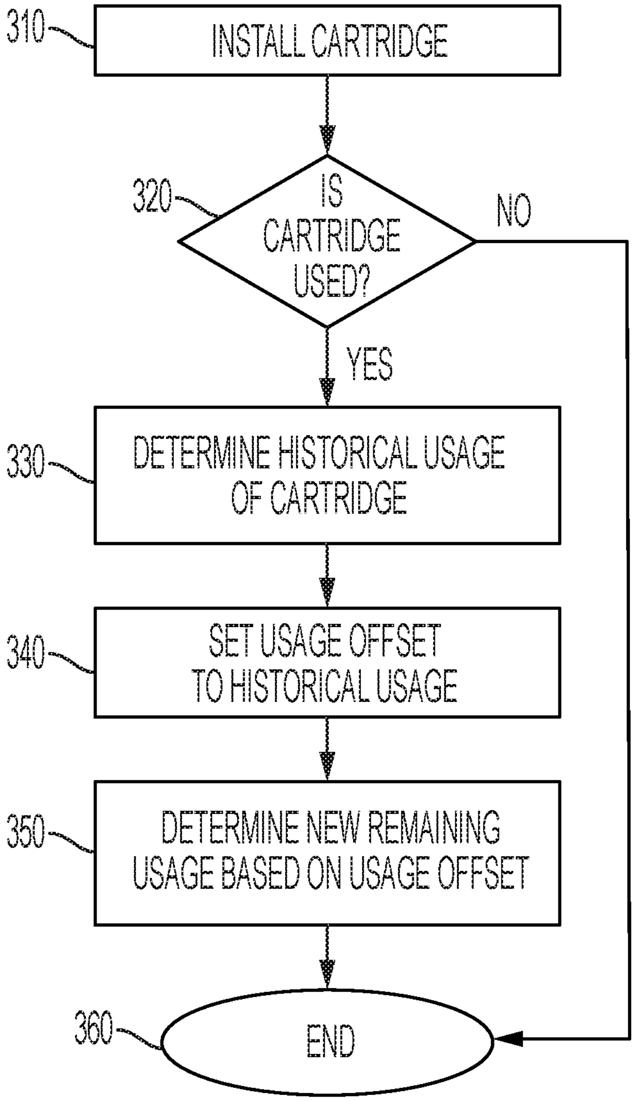
FIG. 3 illustrates a method for determining a new remaining usage of a cartridge according to an example.

FIG. 3 illustrates a method for determining a new remaining usage of a cartridge according to an example.

Referring to FIG. 3, a printing material cartridge may be installed in a printer in operation 310. In operation 320, the printer may determine whether the cartridge is a remanufactured cartridge. For example, the printer may determine a cartridge identifier of the cartridge and a used indicator of the cartridge. If the printer does not recognize the cartridge identifier as corresponding to a cartridge previously used in the printer and if the printer determines that the used indicator has been set, the printer may determine that the cartridge is a remanufactured cartridge. If either the printer recognizes the cartridge identifier as corresponding to a cartridge previously used in the printer or the used indicator has not been set, the printer may determine that the cartridge has not been remanufactured and proceed to operation 360 to end the process.

If the printer determines the cartridge is remanufactured in operation 320, the printer determines a historical usage of the cartridge in operation 330. In an example, the historical usage may be determined based on a number of pages printed by the cartridge, an amount of colorant expended by the cartridge, or a number of dots printed by the cartridge. In operation 340, the printer sets the usage offset equal to the historical usage determined in operation 330. In operation 350, the printer determines a new remaining usage based on the usage offset, the usage counter, and the usage capacity of the cartridge. As an example, the printer may determine the new remaining usage using Equation 2. The printer may display the new remaining usage on a display or a user interface. In operation 360, the process is ended.

Figure 4:
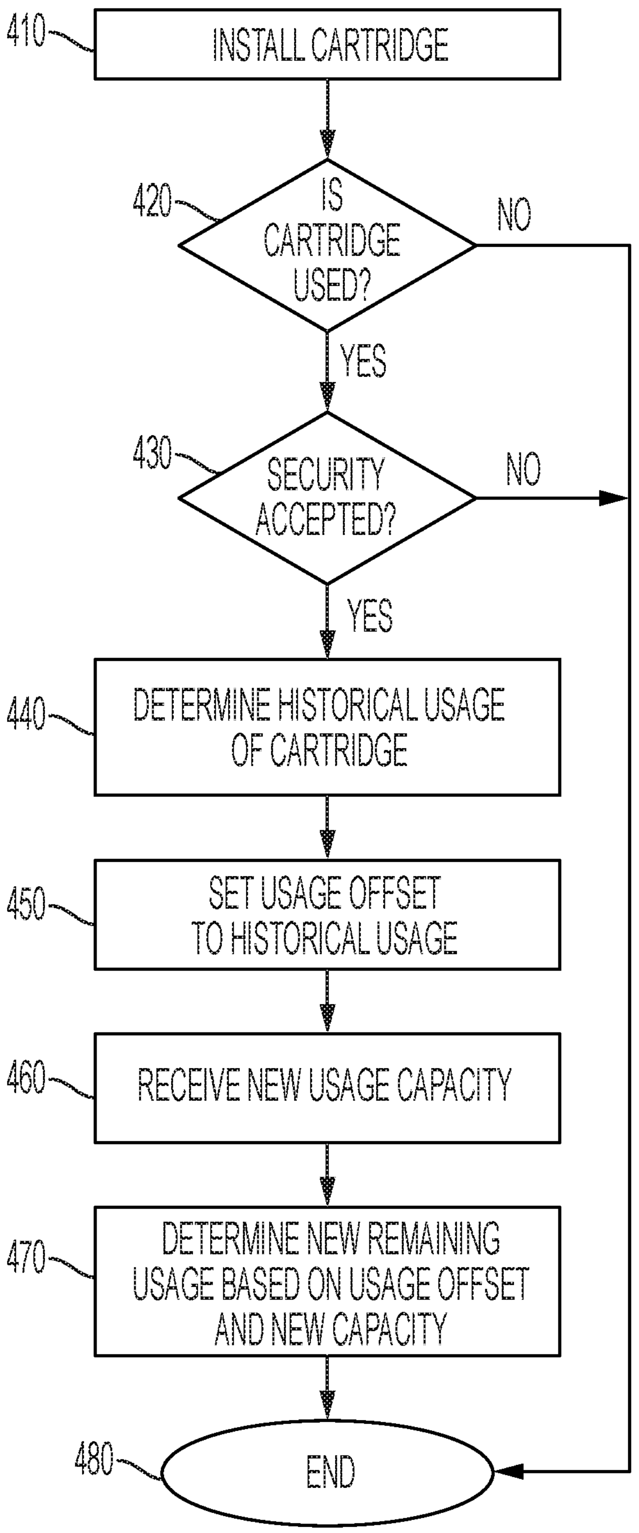
FIG. 4 illustrates a method for determining a new remaining usage of a cartridge based on a signature and a new usage capacity according to an example.

FIG. 4 illustrates a method for determining a new remaining usage of a cartridge based on a signature and a new usage capacity according to an example.

Referring to FIG. 4, a cartridge may be installed in a printer in operation 410. In operation 420, the printer may determine whether the cartridge is a remanufactured cartridge. For example, the printer may determine a cartridge identifier and a used indicator of the cartridge. If the printer does not recognize the cartridge identifier and if the printer determines that the used indicator has been set, the printer determines that the cartridge is remanufactured. If either the printer recognizes the cartridge identifier or determines that the used indicator has not been set, the printer may determine that the cartridge is not remanufactured and proceed to operation 480 to end the process.

In operation 430, the printer may determine whether a security measure has been accepted. As an example, the cartridge installed in the printer in operation 410 may include a security signature (e.g., the signature 126). In that case, the printer may determine if the security signature is valid. If the security signature is determined to be valid, the process may continue to operation 440. In an example, the printer may communicate with an external server, such as a cloud server, to determine if the security signature is valid. If the security signature is not valid, the process may be discontinued in operation 480.

In operation 440, the printer determines a historical usage of the cartridge. In an example, the historical usage of the cartridge may be determined based on a number of pages printed by the cartridge, an amount of colorant expended by the cartridge, a number of dots printed by the cartridge, and the like. In operation 450, the printer sets the usage offset equal to the historical usage determined in operation 440.

In operation 460, the printer receives a new usage capacity of the cartridge. As an example, the cartridge installed in the printer in operation 410 may include a new usage capacity (e.g., the new usage capacity 127) that has been input by a remanufacturer of the cartridge such that, upon installation of the cartridge in operation 410, the new usage capacity is included in the cartridge. In another example, the printer may request a user input in operation 460 as to the capacity of the remanufactured cartridge and store the input value as the new usage capacity. Further, the printer may request a remote server to provide the new usage capacity and receive the new usage capacity from the remote server in operation 460. The printer may store the new usage capacity in the memory of the cartridge or in a memory of the printer.

In operation 470, the printer may determine a new remaining usage based on the usage offset, the historical usage, and the new usage capacity of the cartridge. In an example, the printer may determine a new remaining usage using Equation 2. In operation 480, the process is ended.

Figure 5:
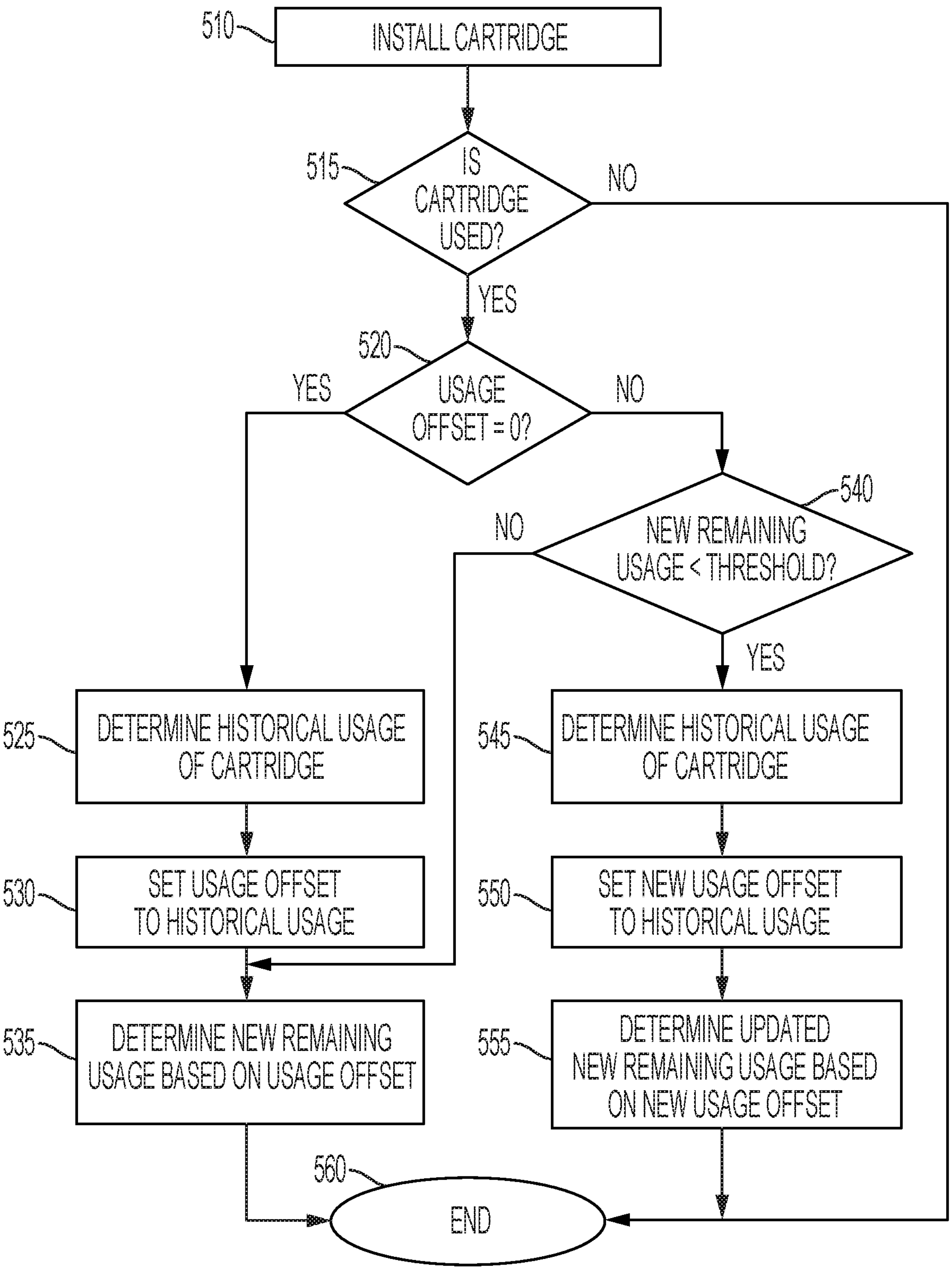
FIG. 5 illustrates a method for determining a new remaining usage of a remanufactured cartridge according to an example.

FIG. 5 illustrates a method for determining a new remaining usage of a remanufactured cartridge according to an example.

Referring to FIG. 5, a cartridge may be installed in a printer in operation 510. In operation 520, the printer may determine whether the cartridge is a remanufactured cartridge. For example, the printer may determine a cartridge identifier and a used indicator of the cartridge. If the printer does not recognize the cartridge identifier and if the printer determines that the used indicator has been set, the printer may determine that the cartridge is remanufactured. If either the printer recognizes the cartridge identifier or that the used indicator has not been set, the printer may determine that the cartridge is not remanufactured and proceed to operation 560 to end the process.

In operation 520, the printer may determine whether a usage offset of the cartridge equals 0. That is, the printer may determine whether the usage offset has been previously set. If it is determined in operation 520 that the usage offset equals 0, the printer proceeds to operations 525, 530, and 535 to determine a historical usage of the cartridge, to set a usage offset equal to the historical usage, and to determine a new remaining usage of the cartridge using Equation 2. Operations 525, 530, and 535, are substantially similar to operations 330, 340, and 350 of FIG. 3 such that a redundant description will not be provided.

On the other hand, if it is determined in operation 520 that the usage offset does not equal 0, then the cartridge is a remanufactured cartridge and may have undergone a second or subsequent remanufacturing process. In operation 540, the printer determines if the new remaining usage is less than a low threshold. For example, the printer may determine the new remaining usage of the cartridge using Equation 2. If it is determined in operation 540 that the new remaining usage is greater than the threshold, the printer may proceed to operation 535 to determine the new remaining usage based on the usage offset that was determined in operation 520, the usage counter, and the usage capacity based on Equation 2.

On the other hand, if it is determined in operation 540 that the new remaining usage is less than the low threshold, the printer may determine the historical usage of the cartridge in operation 545 and set a new usage offset equal to the historical usage in operation 550. That is, the new usage offset allows for a cartridge that has been remanufactured a second or subsequent time to also provide a new remaining usage based on the historical usage of the cartridge. In operation 555, the printer determines an updated new remaining usage based on the new usage offset, the usage counter, and the usage capacity of the cartridge using Equation 2 in which the new usage offset is used in place of the usage offset. In operation 560, the process ends.

Although not illustrated in FIG. 5, an example method may further include an operation to verify authentication of a user based on a signature included on the cartridge, similar to operation 430 in FIG. 4. Further, although not illustrated in FIG. 5, an example method may further include an operation to receive a new usage capacity, similar to operation 460 in FIG. 4.

Figure 6:
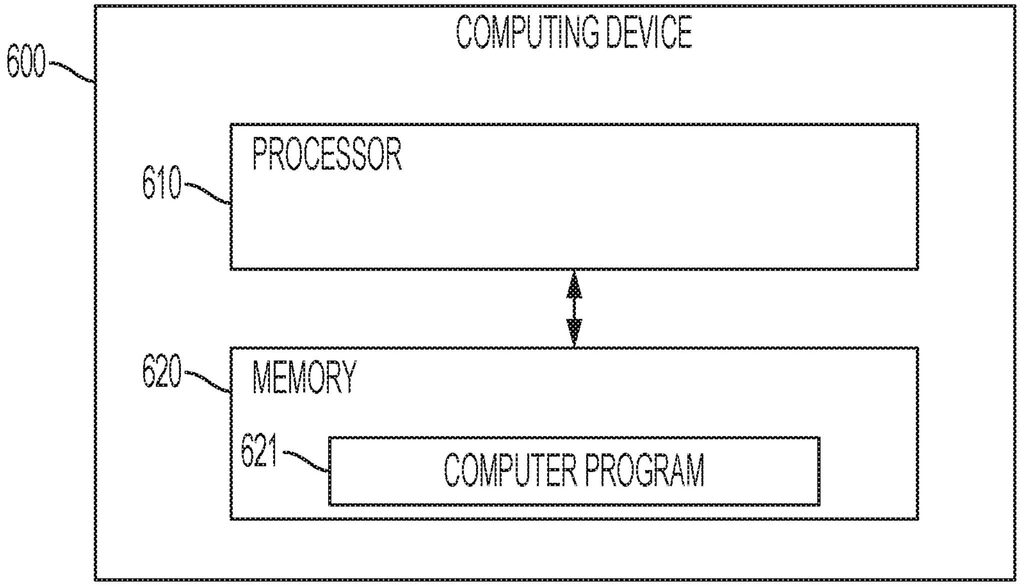
FIG. 6 illustrates a computing device according to an example.

FIG. 6 illustrates a computing device according to an example.

Referring to FIG. 6, a computing device 600 includes a processor 610 and a memory 620. Although not illustrated, the computing device 600 may further include a storage device, a communication interface, a bus, and the like. The computing device 600 may further include other general components.

The processor 610 may control an operation of the computing device 600. The processor 610 may be implemented with processing circuitry. For example, the processing circuitry may include a central processing unit (CPU), an application processor (AP), a microprocessor unit (MPU), a micro controller unit (MCU), an arithmetic logic unit (ALU), a graphic processing unit (GPU), a digital signal processor, a field programmable gate array (FPGA), a system on chip (SoC), a programmable logic unit, or an application-specific integrated circuit (ASIC). In addition, the processor 610 may perform operations on a program for executing an example method as described above.

The memory 620 may store various data, commands, and/or information. The memory 620 may be implemented in the form of a non-transitory computer-readable storage medium for storing instructions or data that is executable by the processor 610. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storages, optical data storages, hard disks, solid-state disks (SSDs), and instructions or software, related data, data files, and data structures, and any devices capable of providing instructions or software, related data, data files, and data structures to a processor or a computer so that the processor or the computer may execute the instructions may be employed.

The memory 620 may load a computer program 621 to execute an example method as described above. For example, an above described example can be written as the computer program 621 and can be implemented in the computing device 600 including the processor 610 that executes the computer program 621.

The computer program 621 may include instructions that cause the processor 610 to perform an above-described example method when loaded into the memory 620. That is, the processor 610 may perform operations for an example method as described above by executing the instructions.

Although examples have been described above, it will be understood by those of ordinary skill in the art that various changes in form and details may be made therein without departing from the spirit and scope as defined by the following claims.

What is claimed is:

1. A printing material cartridge comprising:
an input/output device; and
a memory,
wherein the memory stores an identifier of the cartridge, a usage counter of the cartridge, and an indicator that the cartridge has reached a usage threshold, and
wherein the memory is to store a usage offset equal to a historical usage of the cartridge, the usage offset for determining a new remaining usage of the cartridge.

2. The cartridge of claim 1, wherein the historical usage corresponds to a value of the usage counter at a time of remanufacture and includes at least one of a page count, a dot count, or a colorant accumulation count.

3. The cartridge of claim 1, wherein the memory further stores a usage capacity of the cartridge, the usage capacity for determining the new remaining usage of the cartridge.

4. The cartridge of claim 1,
wherein the memory is to further store a new usage capacity of the cartridge, the new usage capacity for determining the new remaining usage of the cartridge, and
wherein the new usage capacity of the cartridge is received from a user of the cartridge, a remanufacturer of the cartridge, or a remote server.

5. The cartridge of claim 1, wherein the memory further stores a signature for authenticating a valid remanufacture operation.

6. The cartridge of claim 5, wherein the usage offset is obtained from a remote server.

7. The cartridge of claim 1, wherein the indicator that the cartridge has reached the usage threshold includes a binary flag.

8. The cartridge of claim 1, wherein the memory is to further store a low threshold of the cartridge, the low threshold of the cartridge to be used for setting the indicator that the cartridge has reached the usage threshold.

9. An image forming apparatus comprising:
an input/output device; and
a processor to:
determine that a cartridge coupled to the image forming apparatus has reached a usage threshold, set a usage offset equal to a historical use of the cartridge; and determine a new remaining usage of the cartridge based on the usage offset, a usage counter, and a usage capacity of the cartridge.

10. The image forming apparatus of claim 9, wherein the historical use of the cartridge corresponds to a value of the usage counter at a time of remanufacture and includes at least one of a page count, a dot count, or a colorant accumulation count.

11. The image forming apparatus of claim 9, wherein the processor is to determine the new remaining usage of the cartridge based on:

$$\text{New Remaining Usage} = \left(1 - \left(\frac{\text{Usage Counter} - \text{Usage Offset}}{\text{Usage Capacity}}\right)\right) \times 100\%.$$

12. The image forming apparatus of claim 9, wherein the usage capacity of the cartridge is obtained from a memory of the cartridge, from a user input at the image forming apparatus, or from a remote server.

13. The image forming apparatus of claim 9, wherein the processor is further to:

determine if the usage offset equals zero, if the usage offset does not equal zero, determine if the new remaining usage is less than a low threshold, if the new remaining usage is less than the low threshold, set a new usage offset equal to a historical usage of the cartridge upon determining that the offset does not equal zero, and determine an updated new remaining usage of the cartridge based on the new usage offset, the usage counter, and the usage capacity of the cartridge.

14. The image forming apparatus of claim 9, wherein the processor is further to:

set the usage offset when a signature of the cartridge is validated by the printer.

15. A non-transitory computer-readable storage medium encoded with instructions executable by a processor, the computer-readable storage medium comprising:

instructions to obtain an identifier and a usage indicator from a cartridge coupled to an image forming apparatus;

instructions to determine that the cartridge is a remanufactured cartridge based on the identifier and the usage indicator;

instructions to obtain a usage offset equal to a historical usage of the cartridge; and instructions to determine a new remaining life of the cartridge based on the usage offset, a usage counter, and a usage capacity of the cartridge.

* * * * *